A. W. SCHULENBURG.
Shipping-Tank for Fluid.
No. 218,832. Patented Aug. 26, 1879.
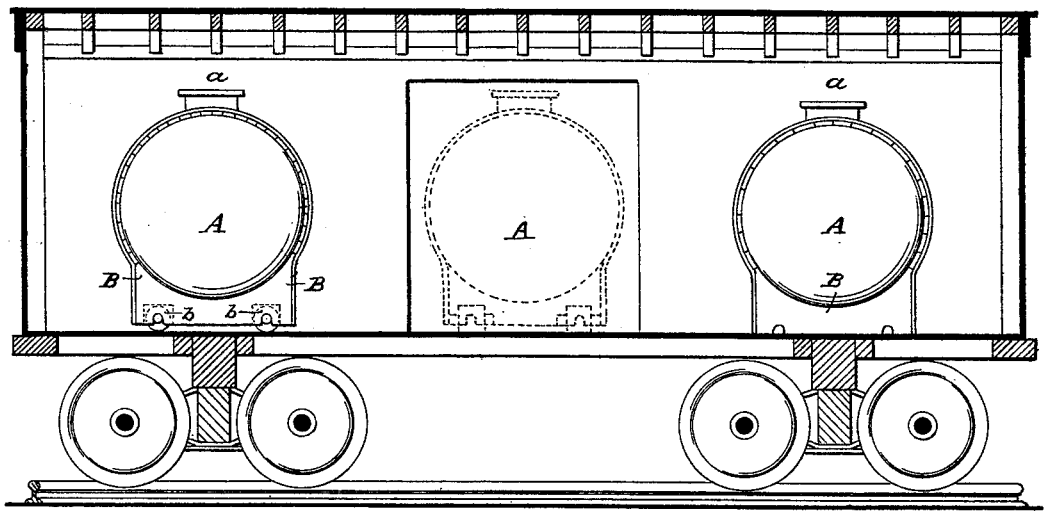
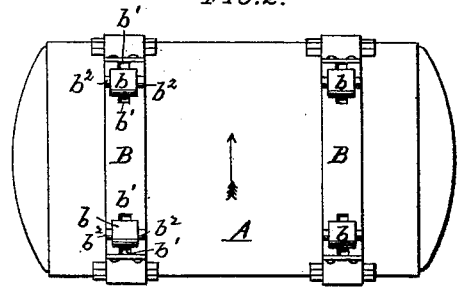
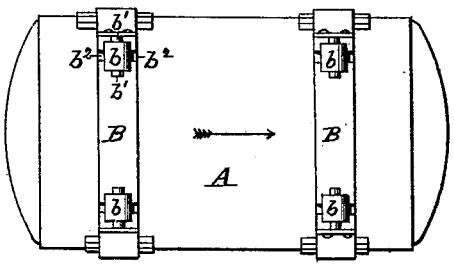
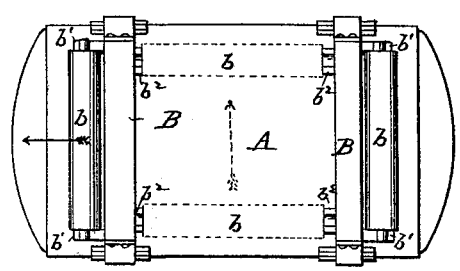
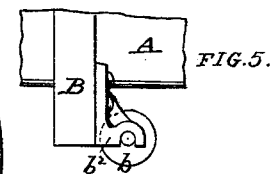
ATTEST:
Ad. Herthel
Chas. Herthel.
INVENTOR:
August W. Schulenburg
per Herthel & Co.

UNITED STATES PATENT OFFICE.

AUGUST W. SCHULENBURG, OF ST. LOUIS, MISSOURI.

IMPROVEMENT IN SHIPPING-TANKS FOR FLUIDS.

Specification forming part of Letters Patent No. 218,832, dated August 26, 1879; application filed July 14, 1879.

*To all whom it may concern:*

Be it known that I, AUGUST W. SCHULENBURG, of St. Louis, Missouri, have invented an Improved Shipping-Tank for Fluids, of which the following is a specification.

This invention relates to the improved manner and means employed to render the rollers readily detachable or be connected to the bottom of the tank, to facilitate the handling, moving, transporting, or shipment of said tanks, and achieve the advantages, all of which will hereinafter appear.

Of the drawings, Figure 1 shows a longitudinal section of a car, the dotted lines showing the position of the tank and its rollers as said parts have entered the doorway of the car. Further, the tanks are shown moved to their proper places over the trucks, resting on rollers, or the latter removed, as may be desired. Figs. 2 and 3 are, respectively, bottom-plan views, the rollers being shown in their different positions to suit the direction that the tank must move (see arrows) to enter the car and be properly placed in same. Figs. 4 and 5 are, respectively, views showing a modification of my invention.

A represents an ordinary tank having the man-hole $a$. The tank or tanks A are made so that their length shall be nearly the width of the ordinary freight-cars used, while the diameter of said tanks is such that each can be conveniently placed into or removed from the car through the door thereof.

My improvements relate to the following construction of parts: Each tank is mounted upon strong wooden supports B B, the latter being strapped or otherwise properly connected to the tank to form part thereof. $b\ b\ b\ b$ represent pairs of similar friction-rollers, each having short projecting journals. $b^1\ b^1\ b^2\ b^2$ represent the corresponding set of recessed bearings to receive the journals of each roller. It is therefore in a set or pair of the recesses that the journals of the rollers turn, the supports B B being otherwise suitably recessed to permit the free rotation of the body of each roller. I lay stress upon the manner enabling me to change the position of the rollers from one pair of recesses to another. Thus, in order to move the tank from the warehouse into the car through its doorway, the respective rollers $b\ b\ b\ b$ are positioned in their bearings $b^2\ b^2$, as shown in Fig. 2. (Also see dotted lines in Fig. 4.) Further, in order to move the tank to its proper place near the end of the car, all the rollers are changed to occupy the position or recesses $b^1\ b^1$. (Shown in Fig. 3, and see full lines in Fig. 4.) Therefore, in moving the tank from the warehouse into the car, the tank has its length occupying the transverse section of the car at its doorway. This result determines the first position for the rollers, the second change for the rollers being simply to move the tank over the trucks or end of the car, the tank still having its length occupying the transverse section of the car.

Figs. 4 and 5 show a modification of my invention, in which but two long rollers are used instead of the four smaller ones above described; also, in place of the four recessed bearings near each bottom corner of the supports, hooks or lugs are fastened to project from the supports. (See Figs. 4 and 5.) In using these long rollers the supports B B are placed equally distant—that is, so that the same two rollers can be used both lengthwise and transversely with relation to the tank or the direction it must move. The change of rollers and the directions the tank is moved is the same in both cases.

The shipping operation and advantages derived from using my improvements are as follows: At the shipping-point the tanks are brought in the position shown in Fig. 1, so that they stand directly over the trucks, whereby the principal point of gravity is brought over the trucks. In this position they are secured by blocking up or removing the rollers; then the tanks are filled, and the space between the two tanks furnishes ample room for one-half car-load assorted goods.

At the point of destination the tanks are emptied, the rollers cleared or inserted, the tanks are moved to the ends of the car, and freight equal to the amount of the weight of a car-load may now be shipped in the vacant space between the tanks.

The necessity heretofore existing of returning empty cars can by my improvement be avoided—a great desideratum in shipments, savings, &c.; also, in the handling of the tanks time, labor, and expense are saved.

What I claim is—

1. In combination with the tank, the supports B B, having the sets of recessed bearings $b^1$ $b^1$ $b^2$ $b^2$ and the rollers $b$, by means whereof the said rollers can be changed to the positions shown and described, as and for the purposes set forth.

2. In combination with the tank, the supports B B, having bearings $b^1$ $b^1$ $b^2$ $b^2$ at the sides of said supports, and the rollers $b$, the said parts being so arranged that the same rollers placed transversely will also suit to be placed longitudinally with relation to the tank, as and for the purposes set forth.

In testimony of said invention I have hereunto set my hand.

AUGUST W. SCHULENBURG.

Witnesses:
 WILLIAM W. HERTHEL,
 AD. HERTHEL.